US008627728B2

(12) United States Patent
Hammonds

(10) Patent No.: US 8,627,728 B2
(45) Date of Patent: Jan. 14, 2014

(54) SYSTEM FOR DETERMINING THE FLOW RATE IN A FLUID WITH LIQUID ADDITIVES USING RECIPROCATING POSITIVE-DISPLACEMENT FLOW METER

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 162 days.

(21) Appl. No.: 13/363,141

(22) Filed: Jan. 31, 2012

(65) Prior Publication Data
US 2013/0192678 A1 Aug. 1, 2013

Related U.S. Application Data

(63) Continuation of application No. 13/363,012, filed on Jan. 31, 2012.

(51) Int. Cl.
*G01F 1/00* (2006.01)

(52) U.S. Cl.
USPC ................................................ 73/861; 222/63

(58) Field of Classification Search
None
See application file for complete search history.

(56) References Cited

U.S. PATENT DOCUMENTS

| | | | |
|---|---|---|---|
| 2,335,809 A | 4/1938 | Stacy | |
| 2,354,634 A | 7/1944 | Griswold | |
| 2,425,691 A | 8/1947 | Brewer | |
| 2,517,406 A | 8/1950 | Mott | |
| 2,553,788 A | 5/1951 | Richardson et al. | |
| 2,750,930 A | 6/1956 | Baur et al. | |
| 3,152,725 A | 10/1964 | Copony et al. | |
| 3,204,452 A | 9/1965 | Sorenson et al. | |
| 3,398,572 A | 8/1968 | Johnson et al. | |
| 3,628,729 A | 12/1971 | Thomas | |
| 3,631,890 A | 1/1972 | McMillen | |
| 3,708,247 A | 1/1973 | Warren | |
| 3,866,799 A | 2/1975 | Rikker | |

(Continued)

FOREIGN PATENT DOCUMENTS

| | | |
|---|---|---|
| DE | 2259152 A1 | 6/1974 |
| DE | 3411156 A1 | 10/1985 |

(Continued)

OTHER PUBLICATIONS

Copenheaver, Blaine R., Notification of Transmittal of the International Search Report and the Written Opinion of the International Searching Authority, or the Declaration—PCT/US2013/020054, May 14, 2013, 1 page, USPTO as International Search Authority, Alexandria, Virginia, USA.

(Continued)

*Primary Examiner* — Harshad R Patel
(74) *Attorney, Agent, or Firm* — Crain, Caton & James, P.C.; James E. Hudson, III

(57) ABSTRACT

System for determining the flow rate of a fluid and for controlling flow rates. The system provides high resolution with infinite turndown, providing a flow meter which may be used in low flow situations and with fluid additives. The flow rate of an additive fluid is determined in real time with high resolution by providing a novel reciprocating positive-displacement flow meter using magnetically coupled components and a transducer to identify the flow rate of the fluid. A system and method may be incorporated into a flow control system for monitoring the flow rate of a fluid which may be included with an additive delivery system for use with the flowing supply of an additive to be introduced into a flow of untreated fluid in relatively minute quantities.

9 Claims, 6 Drawing Sheets

(56) References Cited

U.S. PATENT DOCUMENTS

| | | | |
|---|---|---|---|
| 3,878,864 | A | 4/1975 | Schurger |
| 3,894,433 | A | 7/1975 | Riester et al. |
| 4,043,198 | A | 8/1977 | Stillwell et al. |
| 4,206,643 | A | 6/1980 | Phillips et al. |
| 4,376,172 | A | 3/1983 | Belangee et al. |
| 4,611,105 | A | 9/1986 | Kobold |
| 4,619,146 | A | 10/1986 | Teodorescu et al. |
| 4,637,221 | A | 1/1987 | Levine |
| 4,738,395 | A | 4/1988 | Chilton et al. |
| 4,756,030 | A | 7/1988 | Juliver |
| 4,779,186 | A | 10/1988 | Handke et al. |
| 5,137,435 | A | 8/1992 | Walton |
| 5,286,175 | A | 2/1994 | Hammonds |
| 5,513,963 | A | 5/1996 | Walton |
| 5,520,058 | A | 5/1996 | Campbell et al. |
| 5,544,533 | A | 8/1996 | Sugi et al. |
| 5,835,372 | A | 11/1998 | Roys et al. |
| 6,339,959 | B1 | 1/2002 | Natapov |
| 6,910,405 | B2 | 6/2005 | Walton et al. |
| 6,921,001 | B1 | 7/2005 | Hunt et al. |
| 7,066,353 | B2 | 6/2006 | Hammonds |
| 7,202,658 | B2 | 4/2007 | Ketelaars et al. |
| 8,251,022 | B2 | 8/2012 | Yaccarino |
| 2003/0071062 | A1 | 4/2003 | Miller et al. |
| 2003/0226407 | A1 | 12/2003 | Tomita et al. |

FOREIGN PATENT DOCUMENTS

| | | |
|---|---|---|
| DE | 3505706 A1 | 8/1986 |
| EP | 0449270 A1 | 10/1991 |
| EP | 0472959 A1 | 3/1992 |
| EP | 0508528 B1 | 6/1995 |
| EP | 1517037 A2 | 3/2005 |
| EP | 2041396 B1 | 9/2011 |
| GB | 637019 | 5/1950 |
| GB | 919974 | 2/1963 |
| GB | 920694 | 3/1963 |
| GB | 1595454 | 8/1981 |
| GB | 2146621 A | 4/1985 |
| WO | WO9730930 | 8/1997 |
| WO | WO2006137058 A2 | 12/2006 |
| WO | WO2010028124 A2 | 3/2010 |

OTHER PUBLICATIONS

Copenheaver, Blaine R., International Search Report—PCT/US2013/020054, May 14, 2013, 4 pages USPTO as International Search Authority, Alexandria, Virginia, USA.

Copenheaver, Blaine R., Written Opinion—PCT/US2013/020054, May 14, 2013, 7 pages USPTO as International Search Authority, Alexandria, Virginia, USA.

SYSTEM FOR DETERMINING THE FLOW RATE IN A FLUID WITH LIQUID ADDITIVES USING RECIPROCATING POSITIVE-DISPLACEMENT FLOW METER

CROSS REFERENCE TO RELATED APPLICATIONS

This application is a continuation of U.S. patent application Ser. No. 13/363,012 entitled "Fluid additive delivery system" filed Jan. 31, 2012, to which the priority is claimed.

STATEMENT REGARDING FEDERALLY SPONSORED RESEARCH OR DEVELOPMENT

Not Applicable.

BACKGROUND OF THE INVENTION

1. Field of the Invention

The present invention provides a system for determining the flow rate of a fluid. The invention may be used for measuring the rate of fluid flow and may be included in a larger system for controlling the flow rate of the fluid. More particularly, the invention provides an improved flow meter which includes a ferrous floating internal piston in a reciprocating flow meter, wherein the internal piston is magnetically tied to a coupling arm with an end in magnetic contact with a linear digital encoding transducer equivalent in operable length to the full stroke of the ferrous floating internal piston and which provides immediate data regarding the smallest movement of the internal piston.

2. Description of the Related Art

Systems for measuring fluid flow rates and for introducing measured fluids into flowing fluids are well known. Systems for measuring fluid flow rates are desirable in devices or systems where flow rates must be controlled or verified. Measurement of flow which is accurate, highly precise (high resolution), and consistent is important in various systems utilizing fluid flow for operation. Measurement of those flow rates often must be expressed and communicated in an electronic format that is compatible with programmable logic devices. Moreover, it is desirable to have a high turndown in these systems, although typically one of the most substantial problems with existing meters. Existing meters thus have a narrow (often very narrow) range of operations, problematic in cases of fuel injection where flow may operate between zero flow and high flow rates.

Systems for delivering fluids, including those for introducing fluids as additives into other fluid flows, are well known in the art and are generally desired where the fluid may have a limited duration of effectiveness after introduction to a flowing untreated fluid, particularly in cases where additives may be selected on site based on the specific need at the time. In some of these applications, it is necessary to precisely control the flow of the metered fluid, such as an additive, relative to the flow of a second fluid, such as fuel, being delivered so as to maintain a ratio of fuel to additive, usually represented in parts per million. This can be particularly critical where the flow of the second fluid is relatively low, driving down the flow rate of the metered fluid. Thus, doing so requires accurate measurement of the additive, particularly where usually delivered at a very low flow rate.

With regard to addition of a treating agent, the efficacy of the treated fluid may be effected if the proper volume of additive is not introduced to the untreated flow of a process stream at the current flow rate. Additionally, the cost of the additive to be introduced may be quite high, so cost-effectiveness requires the flow rate, as measured by a flow meter and potentially communicated to an associated logic controller which may in turn control the pump supplying the additive. Ensuring consistent delivery of additive to the untreated fluid is a necessity. Introduction of additive at actual flow rates which are above or below the desired flow rate is undesirable, such as in cases where the additive is introduced to an untreated flow of a petroleum-based fluid where combustion may be over- or under-pressurized in the engine, potentially posing a danger to operators and others. Moreover, other additives effect lubricity or conductivity of fuel with each having the need to be injected accurately over a wide (often very wide) range of flow.

Thus, accuracy, high resolution, and consistency are needed for systems utilizing fluid flow, including systems where additives are used in conjunction with motor and aviation fuels, water-treatment systems, and other systems.

Among the prior art devices directed to determining the flow rate of a fluid flow, either for determination of flow rates or for addition of a treating agent are positive displacement meters such as oval gear flow meters, which may consist of two close tolerance oval gears which, when fluid is passed between the two, produce a rotary motion within the meter housing. A shaft connected to one of the meter oval gears includes a rotating hall affect sensor that is used to signal the speed of the rotating shaft. A revolution of the shaft represents a certain volume of fluid passing through the meter by virtue of the volumetric displacement between the two gears inside the meter housing. Meters of this type are very sensitive to solids since the tolerances within the meter are very close. Such meters are prone to clogging and locking up as a result of various foreign material found in fluids such as additives or treating agents. In addition, many fluids, additives or treating agents have solids that are a part of the fluid, additive or treating agent itself which tend to be highly abrasive. This abrasiveness quickly wears the meter and causes it to quickly lose efficiency and its ability to accurately reflect the volume passing through the meter. Additives such as dyes are very abrasive with a high solids content making them inappropriate for use with oval gear meters. Many fuel additives are injected at extremely small ratios as low as 1 PPM. Oval gear meters require minimum flow rates that far exceed those rates found in additive injection, making them inoperable in these applications.

Other prior art metering systems have included float type flow meters that have utilized floats in static, vertically-aligned flows, and reciprocating pistons which have generally measured flow rate according to travel of the reciprocating piston from one end of the associated cylinder to the other.

Such metering systems are of limited utility in measuring flow rates. Float systems similarly are of limited benefit where the system is susceptible to being out of vertical alignment.

Where used for additive delivery in fuels, such metering systems are of limited utility, specifically where the volume of additive introduced is particularly small relative of the untreated fluid (such as less (preferably substantially less) than 0.25% or, non-equivalently less than 2500 parts per million (PPM) (additive to fuel)). Substantially higher ratios approach the concept of blending.

In addition to the foregoing, due to the minute amount of additive dispensed, and the long time needed for the typical reciprocating metering system to complete one cycle (and hence provide a flow rate) that real time flow rates cannot be obtained the resulting flow rate has not assurance that the resulting average is consistent with the dispensing rate throughout the cycle.

There is therefore a need for an accurate meter flow which performs without reference to the system's orientation with minimal moving parts. There is also a need for a flow meter with a high turndown, providing a wide range of operation. There is also a need to control the flow rate of a relatively minute volume of additive to be dispensed into a flow of untreated fluid by providing a high resolution additive delivery system, to monitor the flow rate of a fluid with high resolution, or to maintain at high resolution a desired flow rate of additive.

SUMMARY OF THE INVENTION

It is therefore, a principle object of the present invention to provide a flow meter, particularly a positive displacement reciprocating flow meter, which produces accurate metering with minimal moving parts and which is accurate over time, regardless of pump efficiency or system leakage. This achieved by providing a cylindrical body with fluid connectors at its sealed ends, a ferrous floating internal piston, a cylindrical ring freely encircling the cylindrical body and magnetically coupled to the ferrous floating internal piston, a high resolution linear digital encoding transducer (preferably cylindrical and absolute) preferably parallel to and equivalent in length to the cylindrical body, a coupling arm integrally affixed to the magnetic ring so as to function as a single unit therewith and having a magnetic section contacting the linear digital encoding transducer, with a valve system providing additive to reciprocate the ferrous floating internal piston and to dispense additive to the untreated fluid, and a computer adapted to determine the position of the coupling arm relative to said linear digital encoding transducer to determine position, and, by measurement of time and determination of change in direction, velocity and a valve controller to control the valve system to reciprocate the ferrous floating internal piston. The sealed ends of the cylindrical body and the magnetic coupling between the ferrous floating internal piston and the linear digital encoding transducer provide reduce or eliminate leakage and maintenance associated with meters since there are no dynamic seals involved.

The valve system may have a fluid input from the flowing supply of fluid, such an an additive, a fluid output, and be in fluid communication with a first end connector at one end of the reciprocating flow meter and in fluid communication with a second end connector at the opposite end of the reciprocating flow meter. The valve system may be switchably operable among a first position and a second position to provide for reciprocation of the ferrous floating internal piston. Switching may be accomplished by a valve driven by solenoids or other actuators. In the first position, the fluid input is in communication with the flowing supply of an additive and the fluid output is in communication with the flow of untreated fluid. Thus the first position connects the fluid input and the second end connector and connects the first end connector with the fluid output and the second position connects the fluid input and the first end connector and connects the second end connector with the fluid output. Thus, the valve system is controlled to cause reciprocation of the ferrous floating internal piston between the cylinder first end and the cylinder second end when the piston approaches each end.

The present flow meter invention, by virtue of its high resolution and infinite turndown, may also be incorporated into a flow control system, such as that for introduction of a flowing additive at a very low ratio of additive fluid to untreated fluid, particularly in cases where a relatively minute volume of additive fluid is to be dispensed into a flow of untreated fluid. The flow meter invention may be used with a pumped supply of additive to monitor and, in conjunction with control of the pump, control the flow of untreated fluid to provide additive at very low ratios of additive to untreated fluid by volume.

A flow control system incorporating the flow meter invention to control the flow of liquid, such as an additive fluid, may also include an output computer providing an output signal consistent with each flow rate and an fluid flow controller intermediate the supply of fluid and the valve system which can control the flow of fluid into the system, through various flow rates or at least between flowing and non-flowing positions. The fluid flow controller may be a computer-controlled pump, potentially operable among a plurality of pump speeds (which may not need to be quantified) or may be a valve in conjunction with a supply of fluid under pressure.

In operation, the flow control system may be employed to ensure the appropriate flow rate (such as the ultralow ratios referenced above), regardless of the efficiency or accuracy of the associated additive pump. This may be accomplished by the flow control system receiving a user input for a desired flow rate of additive, which then activates an additive flow controller at an actual flow rate presumed consistent with the desired flow rate of additive. However, as pumps are prone to wear and leakage, resulting in inaccuracies, the method must verify and adjust, as necessary, the actual flow rate. This is accomplished by introducing the presumed flow rate from the pump to a positive displacement reciprocating piston flow meter for verification.

The flow control system can then compare the presumed flow rate to the output signal to identify the deviation from desired flow rate. Based on determination of this deviation, the flow control system can then adjust the pump's actual flow rate at the flow controller to obtain the desired flow rate.

Unlike the prior art, the present flow meter invention provides a high degree of accuracy by providing identification of the position of the piston in the reciprocating flow meter at all points between the ends of the flow meter. This particularly important as it provides an instantaneous, or real time, rate of flow. Thus, the lag time associated with the imprecision of measurements based on the total stroke of the piston through the flow meter is avoided. Delays in time of position data create a corresponding delay in the adjustments necessary to maintain the pre-set ratio. This lag time had historically been a problem in fuel additive delivery systems when the ratio of additive to untreated fluid was less than 1%. In operation, this results in an additive concentration of about 2500 PPM. In the fuel additive industry, anything over 2500 PPM or ¼% is considered blending and may be accomplished with the lower resolution flow meters or a rotary positive displacement device.

The foregoing and other objectives, features and advantages of the invention will be more readily understood upon consideration of the following detailed description of the invention, taken in conjunction with the accompanying drawings.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only a typical preferred embodiment of the invention and are therefore not to be considered limiting of its scope as the invention may admit to other equally effective embodiments.

DETAILED DESCRIPTION OF THE PREFERRED EMBODIMENT

The present flow meter invention involves the use of magnetically-coupled and sensitive devices to provide precise data to provide an instantaneous high resolution flow meter for monitoring the flow rate of a fluid in real time, even when measured in relatively small units and/or to precisely dispense relatively small volumes of liquid. The flow rate determination provided by the flow meter may be used to control the flow rate of fluid into the flow meter prior to disbursal of the fluid. Similarly, the control over minute volumes of liquid may be used to control the volume of fluid disbursed.

Figure 1:
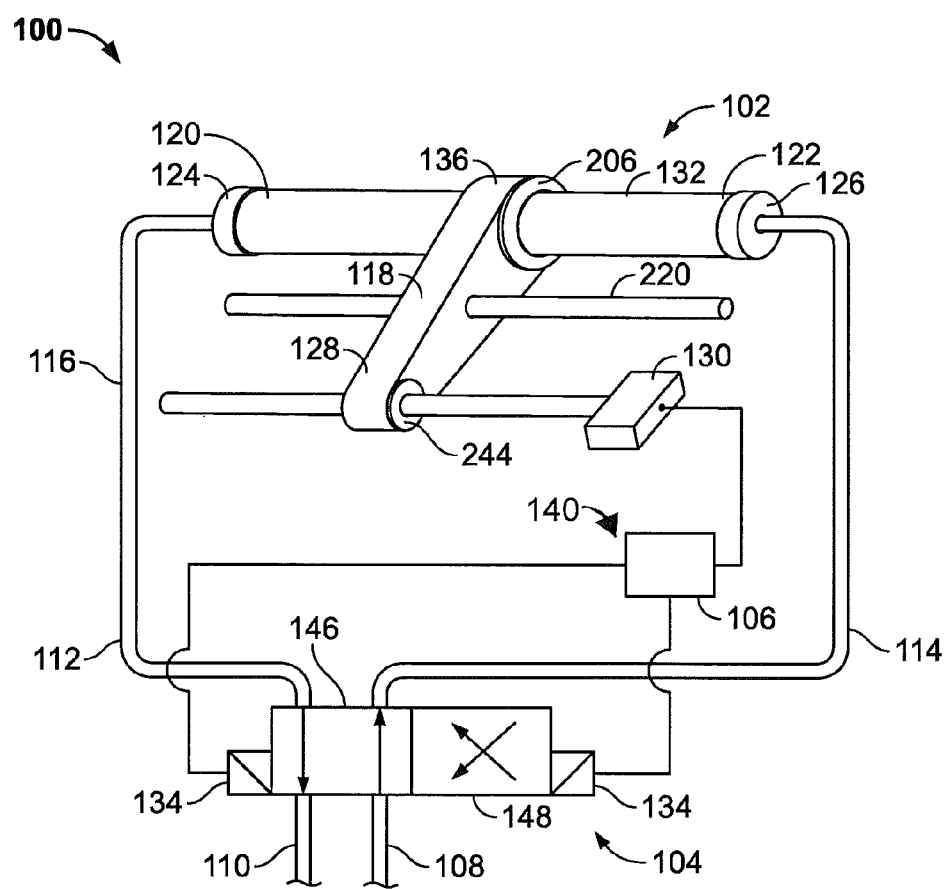
FIG. 1 illustrates the flow meter invention.

Preferably, as identified in FIG. 1, the flow meter invention 100 performs these functions with high resolution by providing a novel positive-displacement flow meter 102 in fluid communication with a valve system 104 to prompt reciprocation of a piston within the cylinder 132 of the flow meter 102. The cylinder 132 has a cylinder first end 120 and a cylinder second end 122, and a first end connector 124 at or about the cylinder first end 120 and a second end connector 126 at or about the cylinder second end 122. The flow mater invention 100 may also include a guide 220 intermediate the cylinder 132 and the transducer 130, and parallel to both. Preferably the cylinder 132, the connectors 124, 126, and the other fluid-conducting components including the orifices through the valve system 104, the fluid input 108 and the fluid output 110 are of a large diameter compared to the size of particulates carried in or constituting the fluid, providing a ratio of at least 20:1.

The flow meter invention includes a position-determining controller 106, preferably a programmable logic controller (PLC), receiving signals from the positive-displacement flow meter 102 to identify the flow rate of the fluid. Operation of the valve system 104 may be controlled by any of various types of valve system controllers 140 known in the art, for example, such as with the position-determining controller 106, such as illustrated in FIGS. 1 and 4 or with a mechanical valve controller, such as automatic shifting mechanism 600, depicted in FIGS. 3, 6 and 7, driven by the actual flow through the flow meter invention 100. Positioned near and in alignment with the cylinder 132 is a linear digital encoding transducer 130. Associated with both the cylinder 132 and the transducer 130 is a coupling arm 118, having a coupling arm first end 136 and a coupling arm second end 128.

The valve system 104 associated with the invention includes a fluid input 108, having a fluid output 110, in fluid communication 112, 114 with a first end connector 124 of the cylinder 132 and in fluid communication with a second end connector 126 of the cylinder 132, respectively. This may be a two-position valve, or a combination of valves providing the same effect. As illustrated in FIG. 1, the valve system 104 is preferably a four-way, two-position valve positioned by two opposing actuators 134, preferably solenoids, although two three-way, two-position valves could be used. Alternatively, the second actuator 134 may be replaced with a spring return. Thus, the valve system 104 is switchably operable among a first position 146 and a second position 148. Switching may be accomplished by one or more solenoid actuators 134 or by other actuators. Preferably, the valve system 104 includes solenoid valves, preferably of the self-cleaning poppet type as these do not utilize wearing surfaces, thus providing a longer system life.

By virtue of the accuracy of the transducer 130, the position-determining controller 106 may determine the position of the coupling arm 118 relative to the linear digital encoding transducer 130 at all positions between the cylinder first end 120 and the cylinder second end 122, and may do so in connection with identification of an associated point in time. Beneficially, as the displacement of the piston 204 may be measured by the transducer 130 and as the cross sectional area of the interior of the cylinder 132 is a fixed and known value, the displacement of the piston 204 as measured by the transducer 130 defines the volume of any fluid passing through the system. Thus, the transducer 130 functions like a micrometer, simply telling the system where the piston 204 is relative to the end of the cylinder 132. As the system (program) knows what the displacement of the cylinder is, a linear unit of measurement therefore represents a fixed amount of fluid. As the distance from the beginning of the stroke is reported, the system knows how much fluid has been displaced. The linear transducer 130 thus serves as a device to measure distance, where distance is directly proportional to volume based on the displacement of the cylinder 132. Alternatively, the position-determining controller 106 may record positions of the coupling arm second end 128 relative to the transducer 130 at associated points in time and may thus determine the speed and direction of movement of the coupling arm second end 128 as a function of change in said position per change in time. The cross-sectional internal area of the cylinder 132 is fixed and constant throughout, so this data also provides the change in volume per unit time, and thus the actual flow rate of the fluid therethrough.

Figure 2:
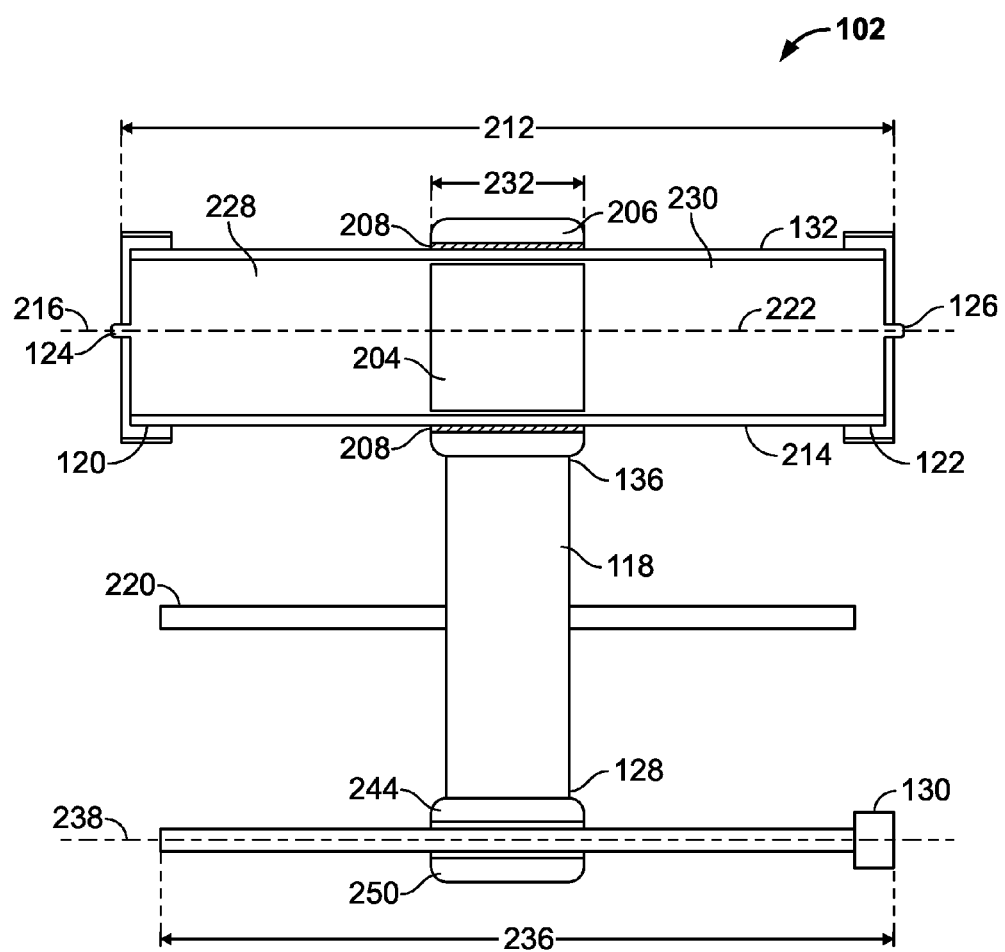
FIG. 2 illustrates the cylinder portion of the flow meter invention.

Referring to FIG. 2, the positive displacement flow meter 102 includes a cylinder 132, a ferrous floating internal piston 204, a cylindrical ring 206 slidably positioned about and closely encircling the cylinder 132, a linear digital encoding transducer 130, and a coupling arm 118 integrally and fixedly associated with the cylindrical ring 206 at its coupling arm first end 136 so as to function as a single unit therewith and in association with the transducer 130. The coupling arm 118 and the cylindrical ring 206 may be constructed as a single unit and may be formed or created as a single piece.

The cylinder 132 and internal piston 204 are necessary constituents of a positive displacement reciprocating piston flow meter 102. The cylinder 132, composed of a non-ferrous material, has length 212, a cylindrical (circular tubular) exterior 214, and a cylinder centerline 216. The cylinder 132 also has a cylinder axis 222 at the cylinder centerline 216 along the cylinder's length 212. The internal piston 204, composed at least in part of a ferrous material and preferably generates a magnetic field, is freely slidable within the cylinder 132 between the cylinder first end 120 and the cylinder second end 122. The outer surface of the piston 204 is fitted sufficiently close to the interior of the cylinder 132 to preclude appreciable leakage between the two resulting chambers 228, 230 divided by the piston 204. The piston 204 further has a length 232 sufficient to prevent the piston from binding during movement and thus to maintain its relationship to the cylinder axis 222. The cylindrical ring 206 is slidably positioned about and closely encircles the cylinder exterior 214, thus capable of sliding along the cylinder exterior 214 without binding and maintained substantially concentric about the cylinder axis 222. The cylindrical ring 206 is composed of magnetic material to magnetically couple to the ferrous floating internal piston 204, but could alternatively be of a ferrous material if the piston generates a magnetic field. Thus, as the piston 204 travels within the cylinder 132, the cylindrical ring 206 likewise travels and maintains its position relative to the piston 204. Preferably, a low-friction material 208, such as a Teflon® ring, may be positioned or inserted between the cylindrical ring 206 and the cylinder 132 to support the cylindrical ring 206, and to maintain the cylinder ring 206 centered about the cylinder 132. Preferably, the low friction material 208 is constructed as a ring to fit within the cylindrical ring 206, but alternatively may be constructed as a sleeve about the cylinder 132. Alternatively the cylinder exterior 214 and the interior of the cylinder ring 206 may each have a low coefficient of friction so the cylinder ring 206 may freely slide and not be susceptible to increased and undesirable friction by a small number of particulates. Additionally, the cylinder exterior 214 or the interior of cylinder ring 206 may be lubricated to reduce friction.

A linear digital encoding transducer 130, preferably absolute, having a transducer length 236 and a transducer axis 238 along its length is also provided. The transducer axis 238 is substantially parallel (preferably parallel) to the cylinder axis 222. The transducer length 236 is generally equivalent to the cylinder length 212. Preferably, the transducer axis 238 is generally parallel to the cylinder axis 222.

The coupling arm 118 may be integrally affixed to or formed with the cylindrical ring 206 at the coupling arm first end 240 so as to function, preferably permanently, as a single unit therewith and maintained generally perpendicular to the cylinder axis 222. The coupling arm 210, which may be constructed of a ferrous metal, includes a magnetic section 244, which may be a magnet 250 or a magnetized section, at the coupling arm second end 242 of sufficient strength to generate a magnetic field contacting or interacting with the linear digital encoding transducer 130 as it rides over or about the transducer 130 to indicate the position of the coupling arm 118 (and thus the cylindrical ring 206) relative to the transducer 130. This may be accomplished by a single arm riding adjacent the transducer 130 or by a section of coupling arm second end 128 or a cylindrical ring integrally affixed to or formed with the cylindrical ring 206 at the coupling arm second end 128 so as to function, preferably permanently, as a single unit therewith, having an opening to encircle the transducer 130. By avoiding a mechanical couple between the piston 204 and the transducer 130, seals through the cylinder first end 120 or the cylinder second end 122 are avoided, particularly as each seal are prone to leakage and may result in unequal operation as the piston 204 reciprocated in the cylinder 132. By avoiding a mechanical couple, the risk of contact by the couple with other metal components, a fire hazard, and the need for additional components to transform the mechanical couple's movement to movement along the transducer 130 are avoided.

Positioning the transducer 130 separate from the cylinder 132, rather than directly in contact or immediately adjacent, is necessary for the accuracy of the transducer 130. Positioning the transducer 130 separate from the cylinder 132 ensures the magnetic field of the internal piston 204 does not interfere with the accuracy of the transducer 130, which utilizes a magnetic field to determine the slightest change in position of the internal piston 204 via the coupling arm 118. Separation, together with the transducer-encircling segment of coupling arm second end 128, provides accurate readings, particularly of the accuracy needed incident to the potentially quite low flow rates involved. This is particularly important as the transducer 130 necessarily must provide a high degree of accuracy with respect to each movement of the piston 204, preferably in the precision of about $1/1,000$ of an inch of travel, rather than the per cycle signal associated with the prior art. The movement over the transducer may be of length selected in light of the fluid, flow rate and length of stroke desired in the flow meter, whether it be 3 inches, 10 inches or 20 inches.

Since the floating internal piston 204 and coupling arm 118 are magnetically coupled, as the floating internal piston 204 moves along the length of the metering cylinder 132, the coupling arm 118 is carried precisely at the same relative position along the length 236 of the linear digital encoding transducer 130. The linear digital encoding transducer 130 translates the relative position of the magnetic section 244 of the coupling arm 210 into an electrical signal which is communicated to the position-determining controller 106, which may be a programmable logic controller.

A guide 220 is preferably used and positioned intermediate the cylinder 132 and the transducer 130, and parallel to both. The guide 220 limits the motion of the coupling arm 118 to a plane parallel to both the cylinder 132 and the transducer 130, reducing the likelihood of the coupling arm 118 binding about the cylinder 132 and the transducer 130. This limitation may be accomplished, for example, by the coupling arm 118 encircling the cross section of the guide 220 as depicted in FIGS. 1 and 2, or the coupling arm 118 having a track on its periphery mating to the guide 220. The guide 220 may provide a low friction point of contact and may be a flat plate. Regardless of its construction, the guide 220 maintains the magnetic section 244 of the coupling arm second end 128 about the transducer 130, preferably concentrically, without contacting the transducer 130.

Referring again to FIG. 1, the position-determining controller 106 may also control the valve system 104 to reciprocate the ferrous floating internal piston 204 between the cylinder first end 120 and the cylinder second end 122 at least when the piston 204 approaches, nearly reaches or reaches the cylinder first end 120 or the cylinder second end 122. The valve system 104 may accomplish this by generating an electric pulse to cause one of the solenoids 134 or another actuator 134 to change position.

Figure 3:
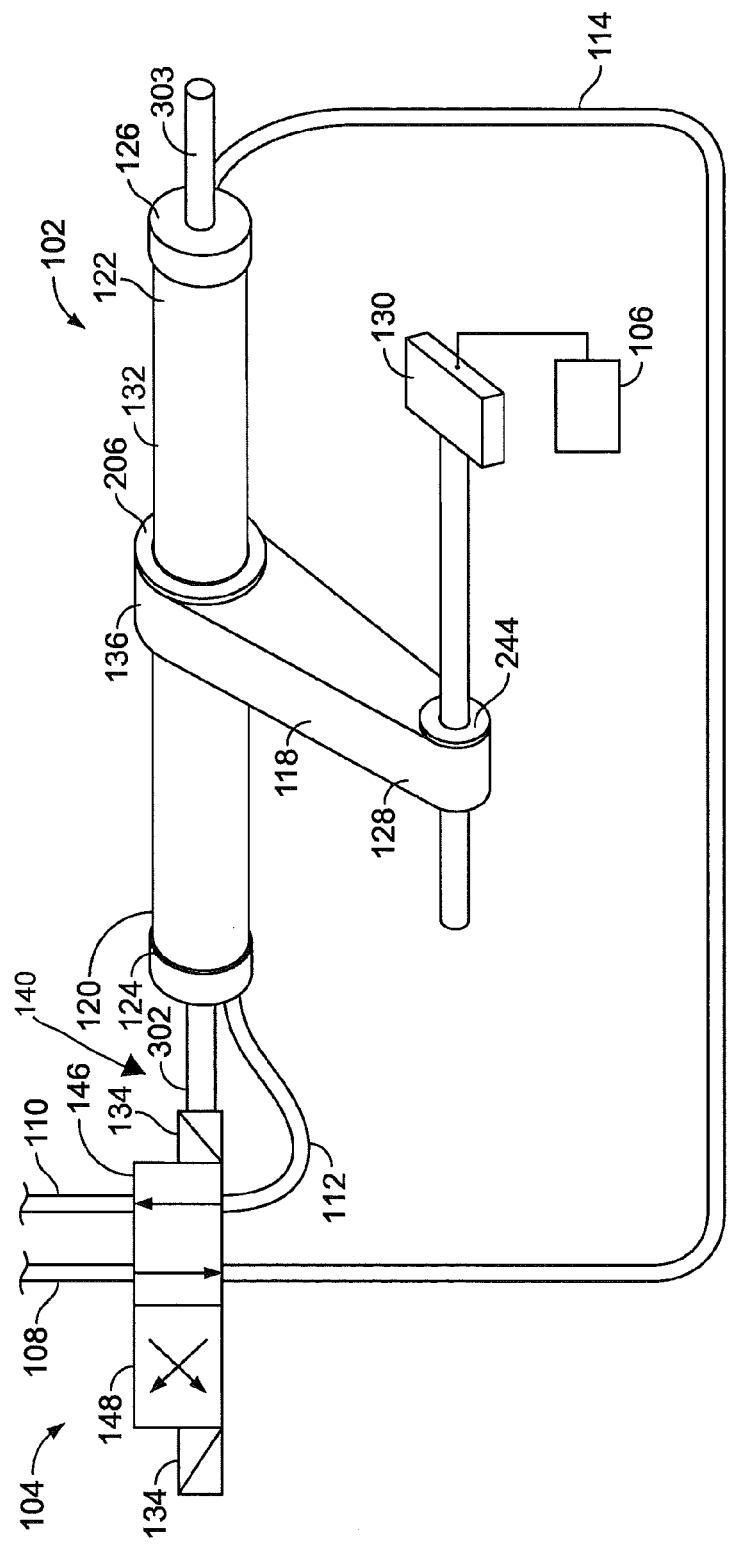
FIG. 3 illustrates an alternative embodiment of the flow meter invention
Figure 4:
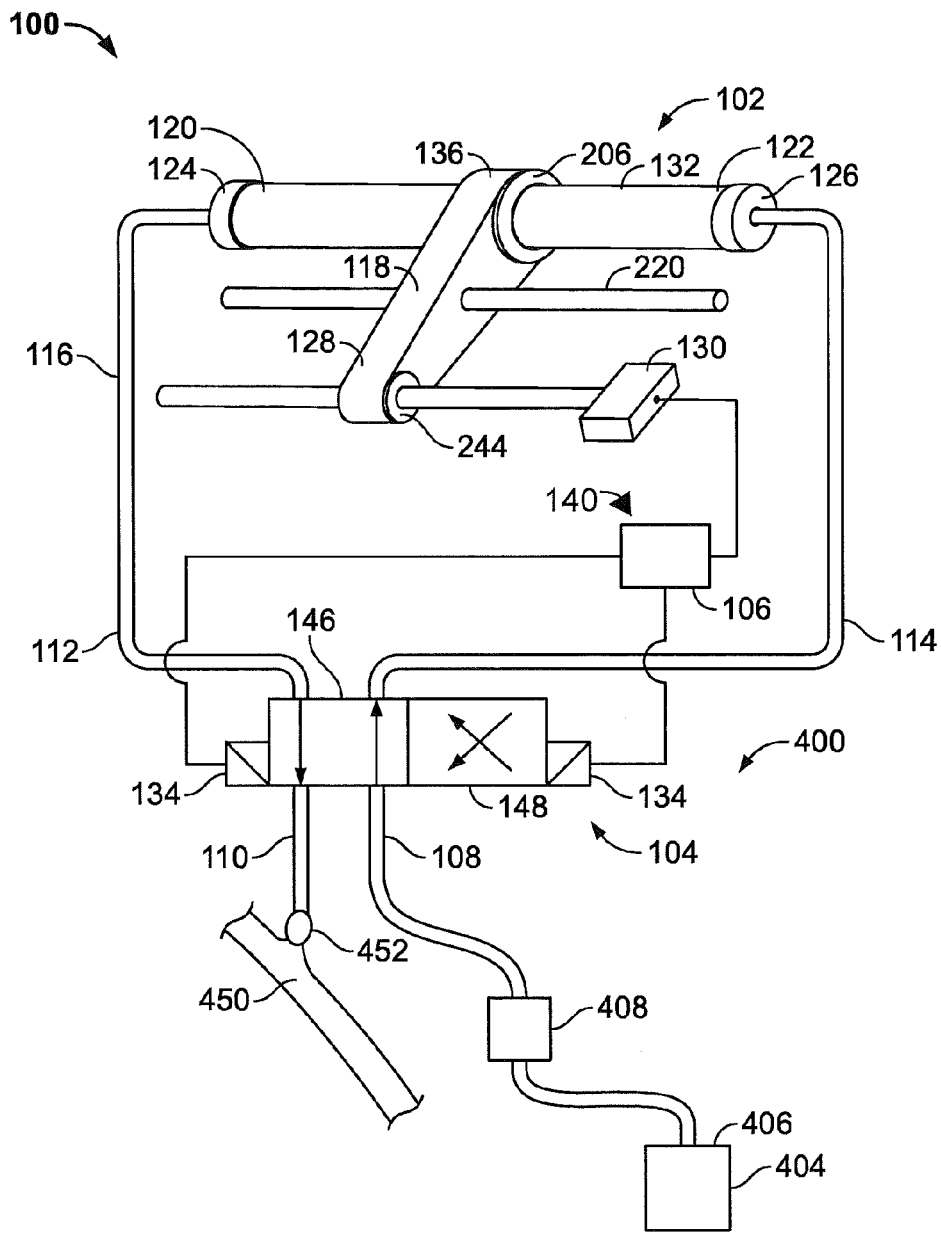
FIG. 4 illustrates the flow control system incorporating the flow meter invention.
Figure 5:
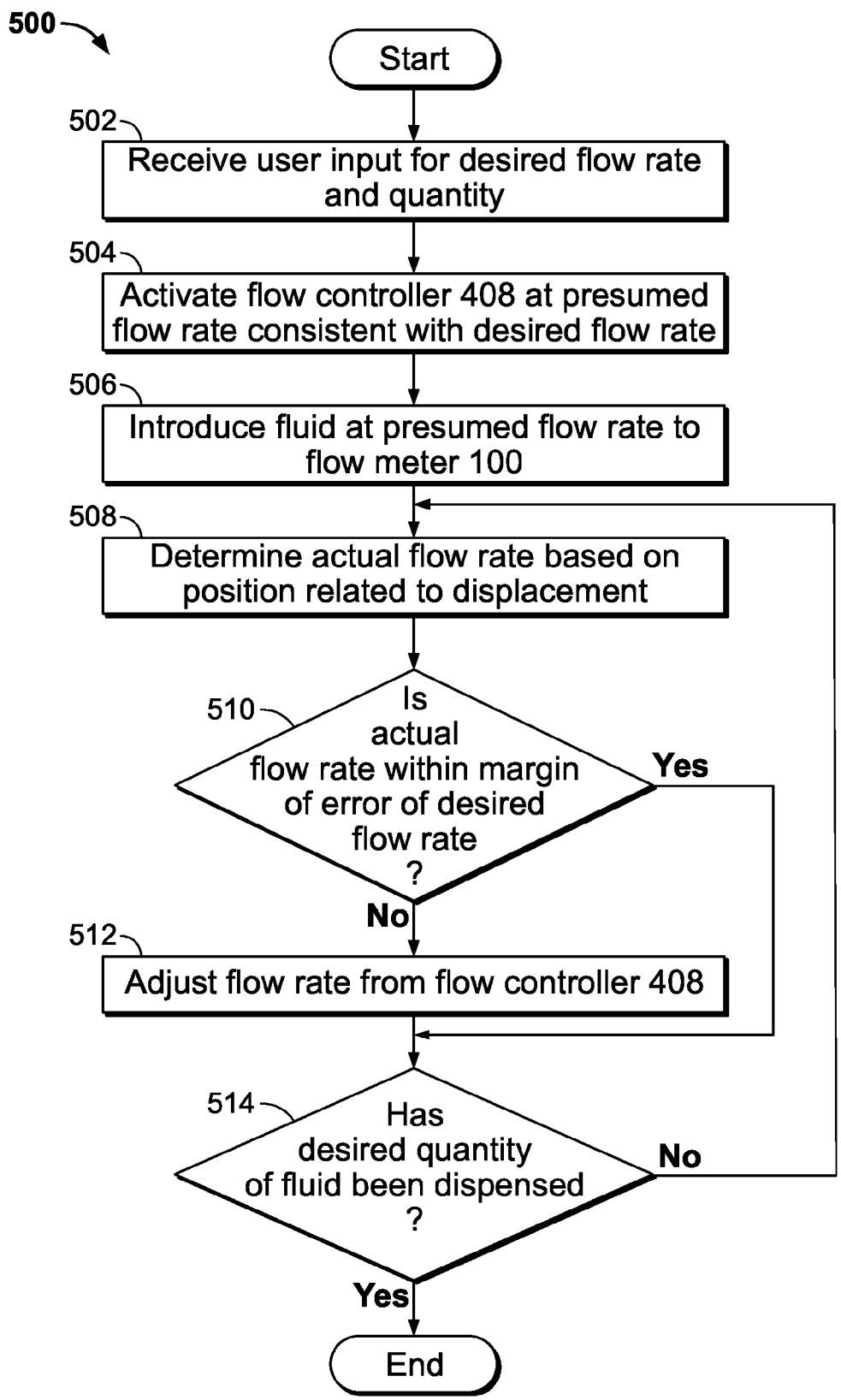
FIG. 5 illustrates the workflow of the flow control system.
Figure 6:
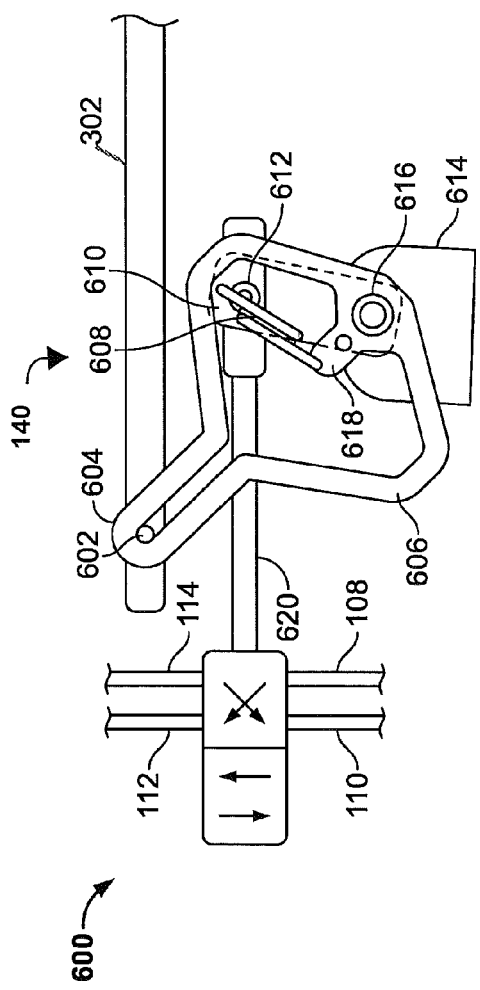
FIG. 6 illustrates a mechanical actuator at one position for use with the flow meter invention.
Figure 7:
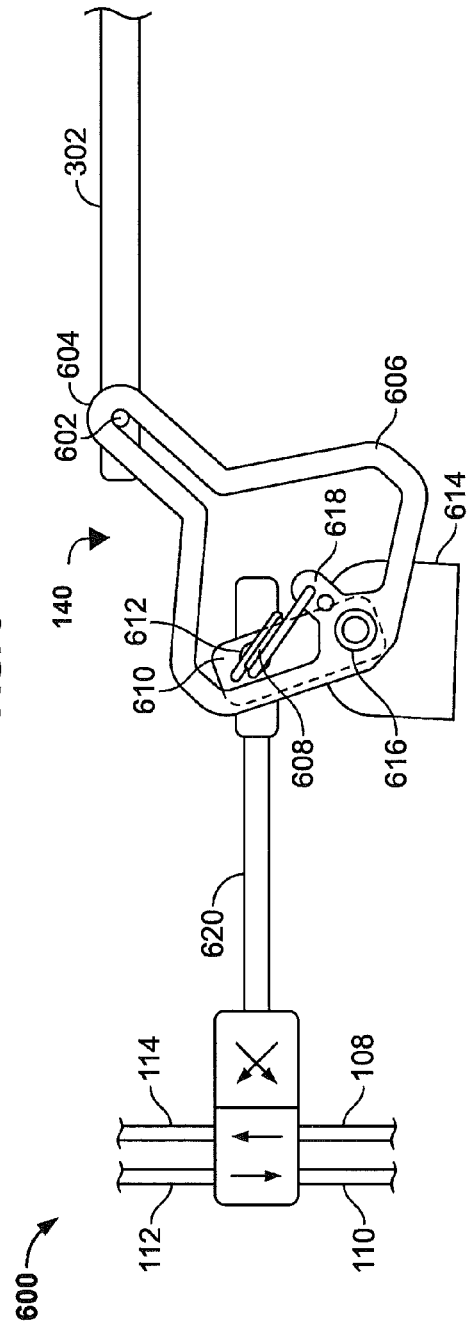
FIG. 7 illustrates the mechanical actuator of FIG. 6 at a second position for use with the flow meter invention.

Alternatively, as illustrated in FIG. 3, the cylinder 132 may have, exiting through either its cylinder first end 120 or its cylinder second end 122, a first rod 302 coupled to the valve system controller 140 of the valve system 104, at an actuator 134 to effect flow reversal at the end of the stroke, that is when the piston 204 reaches or nearly reaches the cylinder first end 120 or the cylinder second end 122. A matching second rod 303, not coupled to any device, would necessarily exit the cylinder 132 at its opposite side and be similarly related to the piston 204 to ensure the volumes of the two chambers 228, 230, and therefore their displacement, are equivalent. The first rod 302 is preferably coupled to the piston 204 to ensure motion in both directions, but could be loaded, such as by a spring, to move with the piston 204. In one embodiment, this could be accomplished with a snap action, spring-loaded shifter to work with a single actuator, such as depicted in FIGS. 6 and 7. Alternatively, a three-way valve could be coupled to each of the two rods 302, 303 to effect operation.

With reference to FIGS. 6 and 7, the valve system controller may comprise an automatic shifting mechanism 600, that shifts the valve system 104 via and in response to the movement of first rod 302 among the first position 146 and the second position 148, thus also reversing the direction of movement of the piston 204 in the flow meter 102.

As shown in more detail in FIG. 6, yoke 606 and a lever 610 are commonly mounted on a bushing 616 fixed to a stationary standard 614. The yoke 606 is shown in an retracting (not upward) position. Yoke 606 and lever 610 are free to independently rotate about bushing 616, except that a torsion spring 608 resiliently couples the free end of lever 610 with an internal arm 618 in yoke 606. The free end of lever 610 is coupled to linkage arm 620 by ball joint connection 612. Pin 602, located at the end of first rod 302, is captured and slides within a narrow neck 604 of yoke 606 and causes yoke 606 to rotate about bushing 616.

In FIG. 6, first rod 302 has reached its outermost limit of travel, and the yoke 606 has actuated to cause lever 610 to be in the downward position. The flow meter 102 has reversed and first rod 302 reverses direction, retracting. As pin 602 moves toward flow meter 102, yoke 606 rotates clockwise about bushing 616, causing internal arm 618 to rotate clockwise. Such clockwise rotation compresses torsion spring 608. The force exerted by torsion spring 608 upon ball joint 612 is still in the direction of retraction. As the first rod 302 approaches its point of travel furthest in retraction, the internal arm 618 is horizontally aligned with ball joint 612 and torsion spring 608 is at maximum compression. Any further motion toward flow meter 102 by first rod 302 causes torsion spring 608 to present an outward force on ball joint 612, which rapidly snaps to its upper position, thereby changing the positions of valve system 104 and changing the direction of fluid flow into flow meter 102.

FIG. 7 shows yoke 606 of the automatic shifting mechanism in the retracted position. As first rod 302 extends, the torsion spring 608 compresses against ball joint 612 in the outward direction until internal arm 618 is horizontally aligned (i.e. reaches minimum distance) with ball joint 612. Ball joint 612, carrying linkage arm 620 then snaps back into the retracting position, thus completing the cycle.

Referring again to FIGS. 1 and 2, since the change in volume of each chamber 228, 230 of the metering cylinder 132 is calculated based on change in position, each thousandths of an inch in length of each chamber 228, 230 the metering cylinder 132 corresponds to a position on the linear digital encoding transducer 130, and therefore accurately represents the flow passing through the flow meter loop 116. Preferably, when the floating internal piston 204 reaches an end of the metering cylinder 120, 122, and when the position-determining controller 106 is used to control the valve system 104, the signal from the linear digital encoding transducer 130 as processed by the position-determining controller 106 to effect a change in position of the valve system 104 among the first and second positions 146, 148 (such as by activating the solenoid actuator 134 to change its position), changing the direction of flow from one end of the metering cylinder to the opposite end 120, 122.

Thus, in operation the fluid from the fluid input 108, and the associated pressure, entering the metering cylinder 132 works against the floating piston 204, and drives the fluid on the opposing, and now discharging, side of the floating piston 204 to be discharged by valve system 104. This is accomplished by ensuring in the first position 146, the fluid input 108 is connected to the second end connector 126 and the first end connector 124 is connected to the fluid output 110. In the second position 148, the fluid input 108 is connected to the first end connector 124 and the second end connector 126 is connected to the fluid output 110, thus reversing the flow of fluid through the flow meter loop 116, and reversing the direction of movement of the piston 204.

Due to the large diameter of the metering cylinder 132 and the orifice diameters throughout the meter, the invention 100 is very tolerant of solids and abrasives and thus provides longer life in addition to improved accuracy. Thus, the metering device 100 is unique in that it does not rely on close tolerance meshing machined parts in order to measure the flow of fluid.

Flow Control System

Because the flow meter invention 100 provides precise determination of the flow rate of a fluid and/or volume of distribution, it may be incorporated into a flow control system 400, such as depicted in FIG. 4, such that the fluid output 110 from the flow meter invention 100 may be discharged where desired, including being introduced into a second fluid 402 as an additive for blending.

The flow control system 400 integrates the flow meter invention 100 intermediate a source 404 of fluid and a destination 450. The source 404 of fluid to be metered, such as an additive, in a supply 406 may be connected to the fluid input 108 of the flow meter invention 100 and may be permitted to introduce the fluid to the fluid input 108. The position-determining controller 106 may then provide an output signal consistent with the associated flow rate to a flow controller 408, operable at least among a fluid flowing position and a fluid non-flowing position, intermediate the supply 406 and the valve system 104. The flow controller 408 may be a computer-controlled pump, including one operable among a plurality of pump speeds, or a valve. The fluid supply 406 may be any type of fluid source, including one flowing and one of fixed volume, which may or may not be under pressure. The destination 450, in communication with the output 110 from the valve system 104 (preferably through an injection point check valve 452 to prevent contamination or backflow pressure in the system) may be another volume, a container, or even a flow of untreated fluid for introduction of an additive or for blending.

In operation, the flow control system 400 may be employed to ensure the desired flow rate of an additive fluid is actually obtained. This may be accomplished by the flow control workflow 500.

At step 502, the system receives a user input for said desired flow rate of additive fluid and a desired quantity.

At step 504, the system activates the additive flow controller 408 at a presumed flow rate consistent with said desired flow rate of additive fluid.

At step 506, the system introduces the additive fluid at presumed flow rate to the flow meter invention 100 via the valve system 104 as controlled by the position-determining controller 106.

At step 508, position-determining controller 106 determines the actual flow rate via the movement of the ferrous floating internal piston 204, i.e. based on position related to displacement (particularly based on the relative position along the length of the transducer), and provides at least one output signal consistent with the actual associated flow rate to the system.

At step 510, the system determines if the actual flow rate is within the margin of error of the desired flow. If the actual flow rate is within the margin of error of the desired flow rate, the system proceeds to step 514. Otherwise, the system continues to step 512.

At step 512, the system adjusts the actual flow rate at said additive flow controller 408 to obtain the desired flow rate from step 502.

At step 514, the system determines if the desired quantity of additive fluid has been provided, which may be based on the actual flow rate(s) and elapsed time(s) or may be based on the displacement of the piston 204 as measured by the transducer 130. If the system determines if the desired quantity of additive fluid has been provided, the method ends. If not, the system returns to step 508.

The resulting system 400 may provide delivery of the fluid to ensure delivery from a flowing supply of a fluid into a flow of a second fluid at a low ratio consistent with additive treatment.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

I claim:

1. A flow meter, comprising:
   a cylinder having a cylinder length, a cylinder exterior, a cylinder centerline, a cylinder first end and a cylinder second end, said cylinder having a cylinder axis at said cylinder centerline along said cylinder length, said cylinder having a first end connector and a second end connector, said cylinder composed of non-ferrous material;
   a ferrous floating internal piston freely slidable in said cylinder between said cylinder first end and said cylinder second end, said piston having a piston length;
   a cylindrical ring slidably positioned about and closely encircling said cylinder exterior, said cylindrical ring magnetically coupled to said ferrous floating internal piston, said cylindrical ring maintained substantially concentric with said cylinder axis;
   an absolute linear digital encoding transducer having a transducer length and transducer axis, said transducer axis substantially parallel to said cylinder axis, said transducer length generally equivalent to said cylinder length;
   a coupling arm having a coupling arm first end and a coupling arm second end, said coupling arm integrally affixed to said cylindrical ring at said coupling arm first end and maintained generally perpendicular to said cylinder axis, said coupling arm having a magnetic section at said coupling arm second end, said magnetic section having a magnetic field interacting with said linear digital encoding transducer;
   a valve system having a fluid input, having a fluid output, in fluid communication with said first end connector and in fluid communication with said second end connector, said valve system switchably operable among a first position and a second position, said first position connecting said fluid input and second end connector and connecting said first end connector with said fluid output and said second position connecting said fluid input and said first end connector and connecting said second end connector with said fluid output; and
   a position-determining controller adapted to determine a plurality of the positions of said coupling arm relative to said linear digital encoding transducer, recording said plurality of positions and an associated time for said plurality of positions, determining the speed and direction of movement of said coupling arm relative to said linear digital encoding transducer as a function of difference in said position between said associated times; and
   a valve system controller adapted to cause said valve system to reciprocate said ferrous floating internal piston between said cylinder first end and said cylinder second end at least when said piston approaches either said cylinder first end or said cylinder second end.

2. The flow meter of claim 1, wherein
   said valve system controller is a computer;
   said position-determining controller is a computer,
   said position-determining controller is adapted to signal said valve system controller when said coupling arm reaches said cylinder first end or said cylinder second end and said valve system controller is adapted to cause said valve system to switch among said first position and said second position.

3. A flow control system for measurement of a flowing fluid substance, comprising:
   a positive displacement reciprocating piston flow meter, said positive displacement flow meter having a first end connector and a second end connector, said positive displacement flow meter comprising:
      a cylinder having a cylinder length, a cylinder exterior, a cylinder centerline, a cylinder first end and a cylinder second end, said cylinder having a cylinder axis at said cylinder centerline along said cylinder length, said cylinder composed of non-ferrous material;
      a ferrous floating internal piston freely slidable in said cylinder between said cylinder first end and said cylinder second end, said piston having a piston length;
      a cylindrical ring slidably positioned about and closely encircling said cylinder exterior, said cylindrical ring magnetically coupled to said ferrous floating internal piston, said cylindrical ring maintained substantially concentric with said cylinder axis;
      an absolute linear digital encoding transducer having a transducer length and transducer axis, said transducer axis substantially parallel to said cylinder axis, said transducer length generally equivalent to said cylinder length;
      a coupling arm having a coupling arm first end and a coupling arm second end, said coupling arm integrally affixed to said cylindrical ring at said coupling arm first end and maintained generally perpendicular to said cylinder axis, said coupling arm having a magnetic section at said coupling arm second end, said magnetic section having a magnetic field interacting with said linear digital encoding transducer;
   a valve system having a fluid input, having a fluid output, in fluid communication with said first end connector and in fluid communication with said second end connector, said valve system switchably operable among a first position and a second position, said first position connecting said fluid input and second end connector and connecting said first end connector with said fluid output and said second position connecting said fluid input and said first end connector and connecting said second end connector with said fluid output; and
   a position-determining controller adapted to determine a plurality of the positions of said coupling arm relative to said linear digital encoding transducer, recording said plurality of positions and an associated time for said plurality of positions, determining the speed and direction of movement of said coupling arm relative to said linear digital encoding transducer as a function of difference in said position between said associated times; and a valve system controller controlling said valve system to reciprocate said ferrous floating internal piston between said cylinder first end and said cylinder second end at least when said piston approaches either said cylinder first end or said cylinder second end.

4. The flow control system of claim 3 wherein said flowing fluid substance is an additive fluid, and wherein said additive fluid is to be introduced into a flow of untreated fluid at a ratio of less than 2500 parts per million of volume of said additive fluid to volume of said untreated fluid.

5. The flow control system of claim 4 further comprising:
said position-determining controller providing an output signal consistent with said associated flow rate; and
an additive flow controller intermediate a supply of said additive fluid and said valve system, said additive flow controller operable among at least an additive fluid flowing position and an additive fluid non-flowing position.

6. The flow control system of claim 5, wherein said additive flow controller is a computer-controlled pump.

7. The flow control system of claim 6 wherein said computer-controlled pump is operable among a plurality of pump speeds.

8. The flow control system of claim 5, wherein said additive flow controller is a valve and said supply of said additive fluid is pressurized 9. A method for obtaining a desired flow rate of fluid additive to a flow of untreated fluid at a ratio of less than 2500 parts per million of volume said fluid additive to volume of said untreated fluid, comprising:
1) receiving a user input for said desired flow rate of fluid additive;
2) activating an additive flow controller at a presumed flow rate consistent with said desired flow rate of fluid additive;
3) introducing the presumed flow rate to a positive displacement reciprocating piston flow meter, said positive displacement flow meter having a first end connector and a second end connector, said positive displacement flow meter comprising:
a cylinder having a cylinder length, a cylinder exterior, a cylinder centerline, a cylinder first end and a cylinder second end, said cylinder composed of non-ferrous material; said cylinder having a cylinder axis at said cylinder centerline along said cylinder length;
a ferrous floating internal piston freely slidable in said cylinder between said cylinder first end and said cylinder second end, said piston having a piston length;
a cylindrical ring slidably positioned about and closely encircling said cylinder exterior, said cylindrical ring magnetically coupled to said ferrous floating internal piston, said cylindrical ring maintained substantially concentric with said cylinder axis;

a linear digital encoding transducer having a transducer length and transducer axis, said transducer axis substantially parallel to said cylinder axis, said transducer length generally equivalent to said cylinder length; and a coupling arm having a coupling arm first end and a coupling arm second end, said coupling arm integrally affixed to said cylindrical ring at said coupling arm first end and maintained generally perpendicular to said cylinder axis, said coupling arm having a magnetic section at said coupling arm second end, said magnetic section having a magnetic field interacting with said linear digital encoding transducer;

a valve system having a fluid input from a flowing supply of said fluid additive, having a fluid output, in fluid communication with said first end connector and in fluid communication with said second end connector, said valve system switchably operable among a first position and a second position, said fluid input in communication with said flowing supply of said fluid additive, said fluid output in communication with said flow of untreated fluid, said first position connecting said fluid input and second end connector and connecting said first end connector with said fluid output and said second position connecting said fluid input and said first end connector and connecting said second end connector with said fluid output; and a position-determining controller adapted to determine a plurality of the positions of said coupling arm relative to said linear digital encoding transducer, recording said plurality of positions and an associated time for said plurality of positions, determining the speed and direction of movement of said coupling arm relative to said linear digital encoding transducer as a function of difference in said position between said associated times; and a valve system controller controlling said valve system to reciprocate said ferrous floating internal piston between said cylinder first end and said cylinder second end at least when said ferrous floating internal piston approaches either said cylinder first end or said cylinder second end; and 4) comparing said presumed flow rate to said at least one output signal and identifying the deviation from desired flow rate; and 5) adjusting the actual flow rate at said additive flow controller to eliminate said deviation.

* * * * *